(12) United States Patent  
Amano et al.

(10) Patent No.: US 10,641,317 B2  
(45) Date of Patent: May 5, 2020

(54) HALF THRUST BEARING

(71) Applicant: DAIDO METAL COMPANY LTD., Nagoya (JP)

(72) Inventors: Seiji Amano, Inuyama (JP); Toru Watanabe, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/196,034

(22) Filed: Nov. 20, 2018

(65) Prior Publication Data

US 2019/0195272 A1   Jun. 27, 2019

(30) Foreign Application Priority Data

Dec. 25, 2017  (JP) .................................. 2017-248187

(51) Int. Cl.
*F16C 19/02*     (2006.01)
*F16C 17/04*     (2006.01)
(Continued)

(52) U.S. Cl.
CPC ................. *F16C 9/02* (2013.01); *F16C 17/04* (2013.01); *F16C 17/045* (2013.01); *F16C 17/102* (2013.01); *F16C 33/046* (2013.01); *F16C 33/103* (2013.01); *F16C 33/107* (2013.01); *F16C 33/1065* (2013.01); *F16C 2240/42* (2013.01); *F16C 2360/22* (2013.01)

(58) Field of Classification Search
CPC .......... F16C 9/02; F16C 17/022; F16C 17/04; F16C 17/045; F16C 17/102; F16C 33/046; F16C 33/103; F16C 33/1065; F16C 33/1075; F16C 33/107; F16C 2360/22; F16C 2240/42

USPC ........ 384/107, 112, 123, 288, 291, 293–294, 384/305, 420, 429
See application file for complete search history.

(56) References Cited

U.S. PATENT DOCUMENTS 5,192,136 A * 3/1993 Thompson ................ F16C 9/02  
384/123  
5,520,466 A * 5/1996 Everitt ..................... F16C 17/10  
384/124  
(Continued)

FOREIGN PATENT DOCUMENTS

JP    07305721 A  * 11/1995  ............. F16C 23/04  
JP    2000-504089 A    4/2000  
JP    2001-323928 A    11/2001

*Primary Examiner* — Marcus Charles  
(74) *Attorney, Agent, or Firm* — Snyder, Clark, Lesch & Chung, LLP

(57) ABSTRACT

Provided is a semi-annular-shaped half thrust bearing having a sliding surface for receiving an axial force and a back surface opposite to the sliding surface. The sliding surface includes a plurality of recesses. Each recess has a recess surface recessed from the sliding surface toward the back surface of the half thrust bearing. The recess surface is convex toward the back surface of the half thrust bearing in cross-sectional view in a circumferential direction of the half thrust bearing. The recess surface includes a plurality of circumferential grooves recessed from the recess surface toward the back surface of the half thrust bearing. The circumferential grooves extend along the circumferential direction of the half thrust bearing, and smooth surfaces and the circumferential grooves are alternately arranged on the recess surface.

10 Claims, 8 Drawing Sheets

(51) Int. Cl.
*F16C 33/10* (2006.01)
*F16C 9/02* (2006.01)
*F16C 33/04* (2006.01)
*F16C 17/10* (2006.01)

(56) References Cited

U.S. PATENT DOCUMENTS

| | | | | |
|---|---|---|---|---|
| 6,095,690 A * | 8/2000 | Niegel | ............... | F16C 17/10 384/288 |
| 6,149,310 A * | 11/2000 | Ono | ............... | F02F 7/0053 384/294 |
| 6,511,226 B2 * | 1/2003 | Thompson | ............... | F16C 9/02 384/294 |
| 7,354,199 B2 * | 4/2008 | Welch | ............... | F16C 9/00 384/275 |
| 8,376,618 B2 * | 2/2013 | Lehmann | ............... | F16C 17/10 384/275 |
| 8,393,792 B2 * | 3/2013 | Muramoto | ............... | F16C 33/046 384/429 |
| 9,188,159 B2 * | 11/2015 | Tanaka | ............... | F16C 33/046 |
| 9,664,229 B2 * | 5/2017 | Murrish | ............... | F16C 7/023 |
| 9,797,435 B2 * | 10/2017 | Tanaka | ............... | F16C 9/02 |

* cited by examiner

HALF THRUST BEARING

BACKGROUND OF THE INVENTION

The present invention relates to a semi-annular-shaped half thrust bearing having a sliding surface for receiving an axial force of a crankshaft of an internal combustion engine.

A crankshaft of an internal combustion engine is rotatably supported in its journal part by a lower portion of a cylinder block of the engine via a main bearing constituted by a pair of half bearings combined into a cylindrical shape. One or both of the pair of half bearings are combined with a half thrust bearing for receiving an axial force of the crankshaft. A half thrust bearing/thrust bearings is/are placed on one or both of end faces in an axial direction of the half bearing.

The half thrust bearing receives an axial force generated in an axial direction of the crankshaft. That is, the half thrust bearing is provided for the purpose of bearing an axial force on the crankshaft, for example, when the crankshaft is connected to a transmission by a clutch.

The crankshaft of the internal combustion engine is supported in its journal part by the lower portion of the cylinder block of the engine via the main bearing constituted by the pair of half bearings. Lubrication oil is fed from an oil gallery in a cylinder block wall via a through hole in a wall of the main bearing into a lubrication oil groove formed along an inner surface of the main bearing. Thus, the lubrication oil is supplied into the lubrication oil groove of the main bearing and is then supplied to the half thrust bearing, In recent years, an oil pump for supplying lubrication oil has been downsized in order to improve fuel economy of the internal combustion engine, and this causes a reduction in an amount of lubrication oil supplied to the bearings. Accordingly, the amount of lubrication oil leaked from end faces of the main bearing decreases, and thus the amount of lubrication oil supplied to the half thrust bearing also tends to decrease. In order to address this problem, for example, a technique has been proposed in which retainability of lubrication oil is improved by forming thin grooves in parallel to each other on a sliding surface of the half thrust bearing (see JP 2001-323928A, for example) or by forming a plurality of minute recesses on a sliding surface of the half thrust bearing (see JP 2000-504089A, for example).

SUMMARY OF THE INVENTION

Since the amount of lubrication oil supplied to the half thrust bearing has been reduced in recent years as described above, a surface of a thrust collar of the crankshaft directly comes into contact with a sliding surface of the half thrust bearing during operation of the internal combustion engine, and thus friction loss is more likely to occur.

In order to address the situation. JP 2001-323928A and JP 2000-504089A disclose a configuration for improving retainability of lubrication oil on the sliding surface by forming oil grooves along a circumferential direction on the sliding surface OP 2001-323928A) and by forming a plurality of minute recesses on the sliding surface (JP 2000-504089A).

However, even though the technique of JP 2001-323928A is employed, friction loss is still more likely to occur. This is because when a surface of the thrust collar of the crankshaft moves closer to the sliding surface of the half thrust bearing during operation of the internal combustion engine, pressure of oil on the surface of the thrust collar and the sliding surface of the half thrust bearing does not sufficiently increase, and thus the surface of the thrust collar still directly comes into contact with the sliding surface of the half thrust bearing.

Furthermore, even though the technique of JP 2000-504089A is employed, when the surface of the thrust collar of the crankshaft moves closer to the sliding surface of the half thrust bearing during operation of the internal combustion engine, turbulence occurs in an oil flow near the recess. The turbulence causes friction loss and greatly reduces pressure of oil between the sliding surface adjacent to the recess and the surface of the thrust collar. This causes the oil to unable to bear a load from the surface of the thrust collar so that the surface of the thrust collar directly comes into contact with the sliding surface, and thus the friction loss is increased.

An object of the present invention is to provide a half thrust bearing of a crankshaft of an internal combustion engine, which is capable of reducing friction loss caused by occurrence of turbulence during operation of the internal combustion engine.

In an aspect of the present invention, a half thrust bearing is provided for receiving an axial force of a crankshaft of an internal combustion engine. The half thrust bearing has a semi-annular shape, and has a sliding surface for receiving the axial force and a back surface opposite to the sliding surface. The sliding surface includes a plurality of recesses. Each recess has a recess surface. The recess surface is recessed from the sliding surface toward the back surface of the half thrust bearing. The recess surface is convex toward the back surface of the half thrust bearing in cross-sectional view in a circumferential direction of the half thrust bearing. The recess surface includes a plurality of circumferential grooves. The circumferential grooves are recessed from the recess surface toward the back surface of the half thrust bearing. The circumferential grooves extend along the circumferential direction of the half thrust bearing and smooth surfaces and the circumferential grooves are alternately arranged on the recess surface.

According to an embodiment of the present invention, a depth of the recess is preferably 2 to 50 μn.

According to an embodiment of the present invention, a depth of the circumferential groove is preferably 0.2 to 3 μm. Furthermore, a width of the circumferential groove is preferably 5 to 50 μm. Furthermore, the circumferential grooves are located preferably with a pitch of 5 to 100 μm.

According to an embodiment of the present invention, the recess preferably has an opening having a circular shape, an elliptical shape, or a quadrilateral shape. Furthermore, an opening of the recess preferably has an elliptical shape, and a major axis of the elliptical shape preferably extends along the circumferential direction of the half thrust bearing.

According to an embodiment of the present invention, the recess surface is preferably convex toward the back surface of the half thrust bearing in cross-sectional view in a diameter direction of the half thrust bearing.

According to an embodiment of the present invention, the recesses are preferably uniformly located throughout the sliding surface of the half thrust bearing.

According to an embodiment of the present invention, as the recess is located closer to an outer peripheral edge of the sliding surface of the half thrust bearing in a diameter direction of the half thrust bearing, the recess preferably has larger area of the opening.

DETAIL DESCRIPTION OF THE INVENTION

Embodiments of the present invention and their advantages will be described in detail below with reference to the accompanying drawings. The embodiments below are provided merely as examples and do not limit the present invention.

General Configuration of Bearing Device

Figure 1:
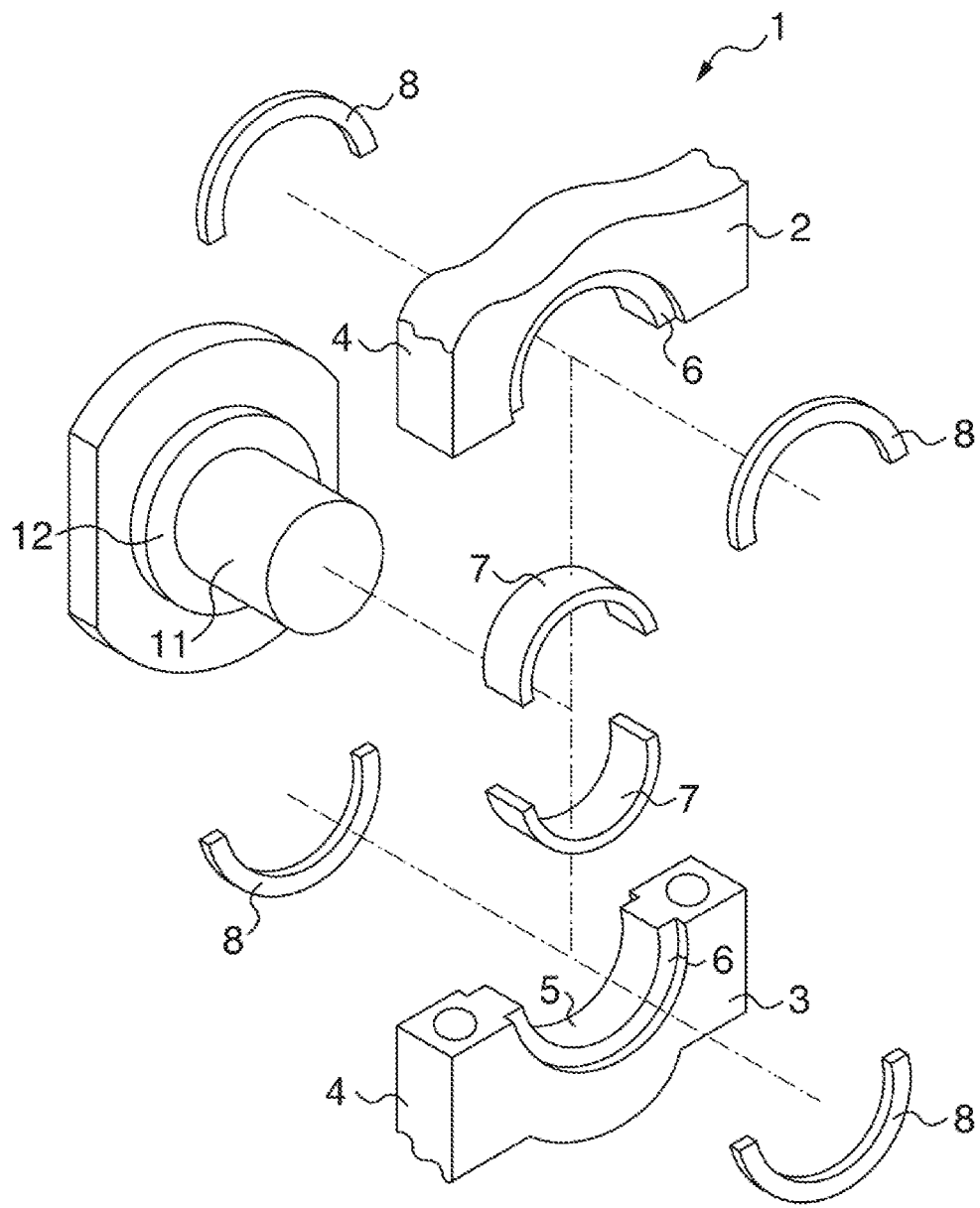
FIG. 1 is an exploded perspective view of a bearing device.
Figure 7:
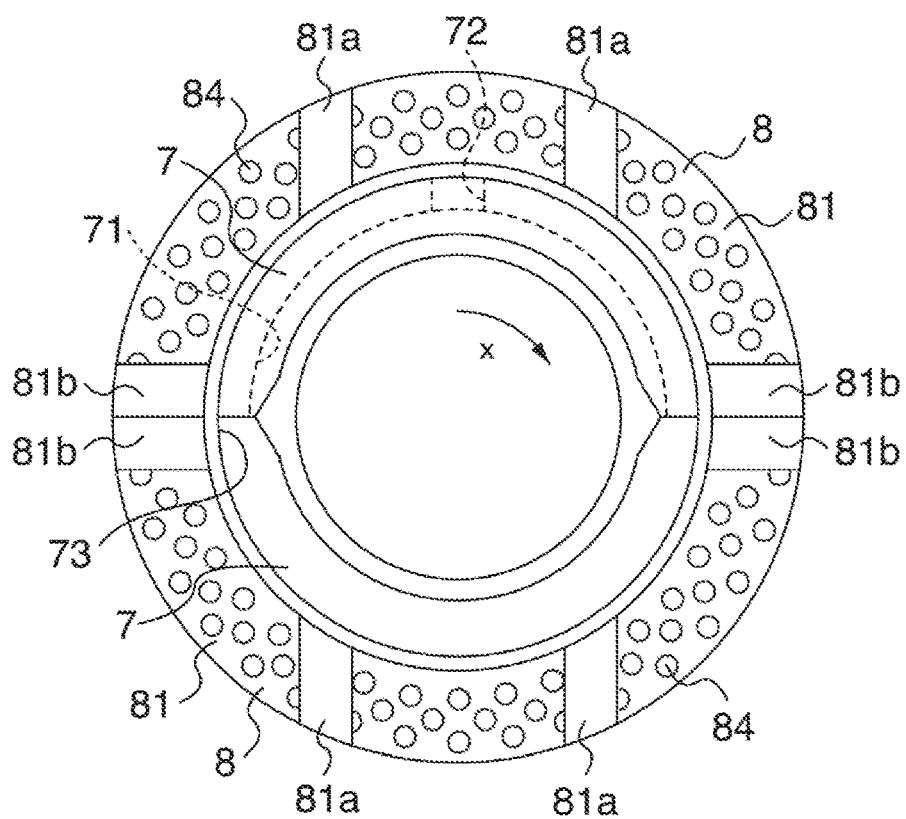
FIG. 7 is a front view of a half bearing and a thrust bearing.
Figure 8:
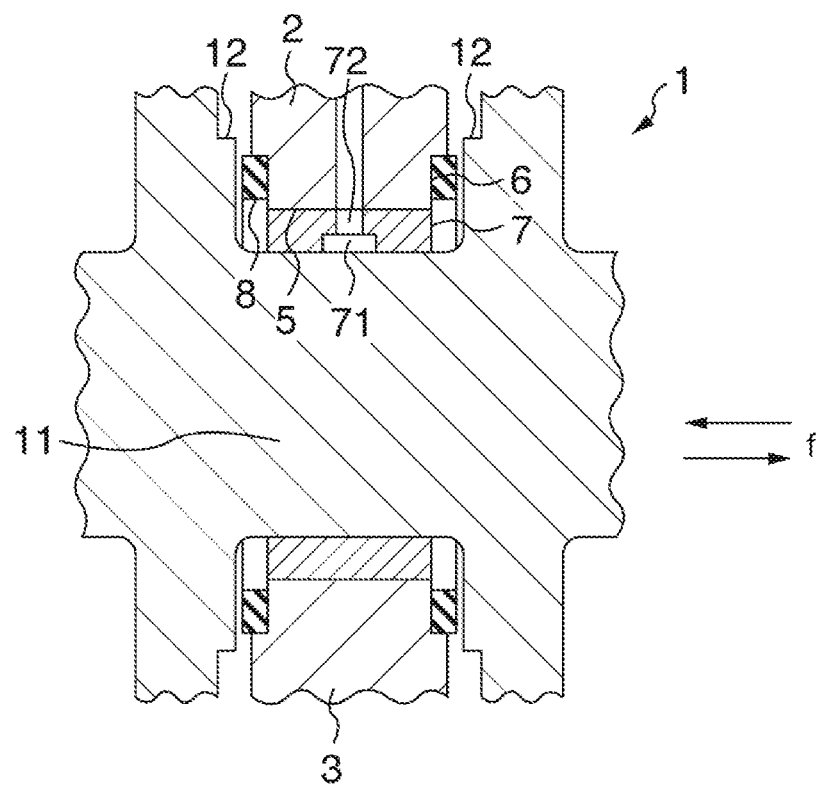
FIG. 8 is a cross-sectional view of the bearing device.

First, with reference to FIGS. 1, 7, and 8, a description will be given of a general configuration of a bearing device 1 including a half thrust bearing 8 of the present invention. As shown in FIGS. 1, 7, and 8, a bearing housing 4 constituted by a cylinder block 2 and a bearing cap 3 attached to a lower portion of the cylinder block 2 has a bearing hole 5 and seats 6. The bearing hole 5 is a circular hole passing through side surfaces of the bearing housing 4. The seats 6 forms an annular recess at a peripheral edge of the bearing hole 5 on the side surface. In the bearing hole 5, half bearings 7 combined into a cylindrical shape are fitted. The half bearings 7 rotatably support a journal part 11 of a crankshaft. In the seats 6, the half thrust bearings 8 combined into an annular shape are fitted. The half thrust bearings 8 receive an axial force "f" (see FIG. 8) via a thrust collar 12 of the crankshaft.

As shown in FIG. 7, the half bearing 7 positioned closer to the cylinder block 2. (on an upper side), among the half bearings 7 constituting a main bearing, has an inner surface having a lubrication oil groove 71 and a through hole 72 passing through the half bearing 7 from the lubrication oil groove 71 to an outer surface of the half bearing 7. The lubrication oil groove may be formed in both the upper and lower half bearings. The half bearings 7 each include, at both ends, crush reliefs adjacent to surfaces at which the half bearings 7 abut each other.

In the bearing device 1, lubrication oil is pressurized and discharged by an oil pump (not shown), and the lubrication oil is supplied from an inner oil passage of the cylinder block 2 via the through hole 72 passing through a wall of the half bearing 7 into the lubrication oil groove 71 on the inner surface of the half bearing 7. A part of the lubrication oil supplied into the lubrication oil groove 71 is supplied to the inner surface of the half bearing 7. Another part of the lubrication oil enters an opening of an inner oil passage of the crankshaft (not shown) on a surface of the journal part and is sent toward a crankpin. Another part of the lubrication oil flows outward from both ends, in a width direction of the half bearings 7, of each of the pair of half bearings 7 constituting the main bearing through a gap between a surface of the crush relief of the half bearings 7 and the surface of the journal part 11 of the crankshaft. The lubrication oil flowing outward from the both ends of each of the half bearings 7 in the width direction mainly flows into a gap between a sliding surface 81 of the half thrust bearing 8 and a surface of the thrust collar 12 of the crankshaft (hereinafter, the gap between the sliding surface 81 and the surface of the thrust collar 12 is referred to as "sliding surface/thrust collar gap").

In general, the thrust bearing 8 bears an axial force "f" from the crankshaft by an oil pressure generated between the sliding surface of the thrust bearing 8 and the surface of the thrust collar of the crankshaft.

Immediately after the crankshaft is connected to a transmission by a clutch from disconnected state, torque reaction in an axial direction is generated, and the axial force "f" is applied impact to the crankshaft from an end of the crankshaft on an output side for rotation force of the crankshaft. Thus, the crankshaft is displaced in a direction opposite to the output side. At this point, the sliding surface 81 of the half thrust bearing 8 receives the axial force "f" as a maximum load, and the sliding surface 81 of the half thrust bearing 8 becomes closest to the surface of the thrust collar 12 of the crankshaft. While the surface of the thrust collar 12 is moving closer to the sliding surface of the half thrust bearing 8, oil in the gap between the surface of the thrust collar 12 and the sliding surface of the half thrust bearing 8 is compressed and pressure of the oil is increased. When the surface of the thrust collar 12 becomes closest to the sliding surface of the half thrust bearing 8, the pressure becomes maximum.

A conventional half thrust bearing (JP 2001-323928A) having a sliding surface including a plurality of circumferential fine grooves extending along the entire circumferential length of the sliding surface has the following problems. While the surface of the thrust collar 12 separated from the sliding surface of the half thrust bearing is moving relatively closer to the sliding surface, oil between the sliding surface of the half thrust bearing and the surface of the thrust collar 12 flows in the circumferential grooves and flows out from open ends of the oil groove or the circumferential grooves in a thrust relief into the oil groove or a thrust relief gap. Thus, even when the surface of the thrust collar 12 becomes closest to the sliding surface, pressure of the oil does not become sufficiently high. Accordingly, the surface of the thrust collar 12 directly comes into contact with the sliding surface of the half thrust bearing, and thus friction loss is increased.

Figure 17:
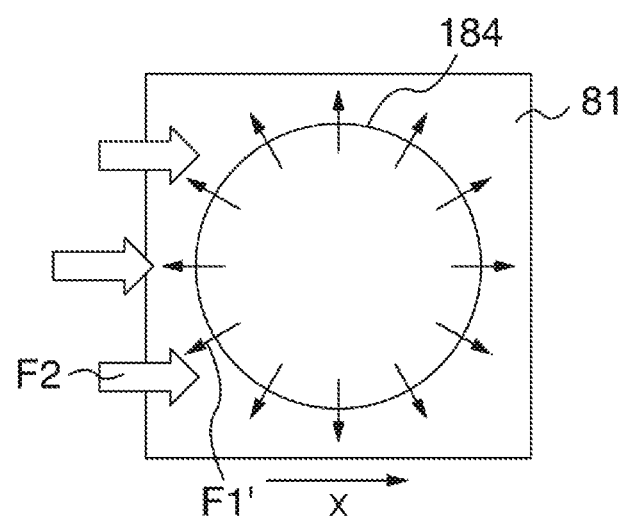
FIG. 17 shows a recess according to a conventional technique, viewed from the sliding surface side.

Furthermore, a conventional half thrust bearing (JP 2000-504089A) having a sliding surface including a plurality of minute recesses has the following problems. When the surface of the thrust collar 12 separated from the sliding surface of the half thrust bearing having the minute recesses moves relatively closer to the sliding surface and the surface of the thrust collar 12 becomes closest to the sliding surface, oil in the recess is compressed to have high pressure and flows out from the recess to the gap (sliding surface/thrust collar gap) between the sliding surface and the surface of the thrust collar 12. As shown in FIG. 17, in a case where a minute recess 184 has a smooth surface, an oil flow that is compressed to have high pressure in the recess and overflows from the recess into the sliding surface/thrust collar gap flows in all directions. Accordingly, only part of the oil flow flows in the same direction as a rotation direction X of the surface of the thrust collar 12, and most of the oil flow forms an oil flow F1' flowing in a direction different from the rotation direction X of the surface of the thrust collar 12. Since an oil flow F2 following the rotating surface of the thrust collar 12 has been formed in the sliding surface/thrust collar gap, when the oil flow F1' in a direction different from the rotation direction X of the surface of the thrust collar 12 flows out from the recess, the oil flows flowing in different directions collide with each other between the sliding surface 81 adjacent to an opening of the recess 184 and the surface of the thrust collar 12, thereby causing turbulence. The turbulence causes friction loss and greatly reduces pressure of the oil between the sliding surface adjacent to the opening of the recess and the surface of the thrust collar 12. Accordingly, a load from the surface of the thrust collar 12 becomes unbearable so that the surface of the thrust collar 12 comes into contact with the sliding surface 81, and thus the friction loss is increased.

The present invention addresses such problems of the conventional techniques. An example of a configuration of a half thrust bearing according to the present invention will be described below.

Configuration of the Half Thrust Bearing

FIGS. 2 to 7 show a configuration of the half thrust bearing 8 according to a first embodiment of the present invention. The half thrust bearing 8 has a flat semi-annular shape and is made of bimetal obtained by bonded to a thin bearing alloy layer to a back-metal layer made of steel. The half thrust bearing 8 has the sliding surface 81 which is a surface of the bearing alloy layer and supports the thrust collar 12. The sliding surface 81 is parallel to a back surface which is a surface of the back-metal layer opposite to the bearing alloy layer. The half thrust bearing 8 may include thrust reliefs 81b on the surface of the bearing alloy layer in regions adjacent to respective circumferential end faces 83. Furthermore, in order to enhance oil supply performance to the sliding surface 8, the surface of the bearing alloy layer may have two oil grooves 81a between the thrust reliefs 81b on both sides. Herein, the "sliding surface 81" refers to a surface excluding the thrust reliefs 81b and the oil grooves 81a from the surface of the bearing alloy layer.

The thrust reliefs 81b are wall-thickness reduced regions provided in both circumferential end regions on the sliding surface 81 of the half thrust bearing 8 such that a thickness of walls of the thrust reliefs 81b is gradually reduced toward the respective end faces. The thrust reliefs 81b extend along the entire length of the circumferential end face of the half thrust bearing 8 in a diameter direction of the half thrust bearing 8. The thrust reliefs 81b are provided in order to reduce positional deviation between the circumferential end faces 83 of a pair of half thrust bearings 8, for example, when the half thrust bearings 8 are assembled in the split-type bearing housing 4.

Figure 2:
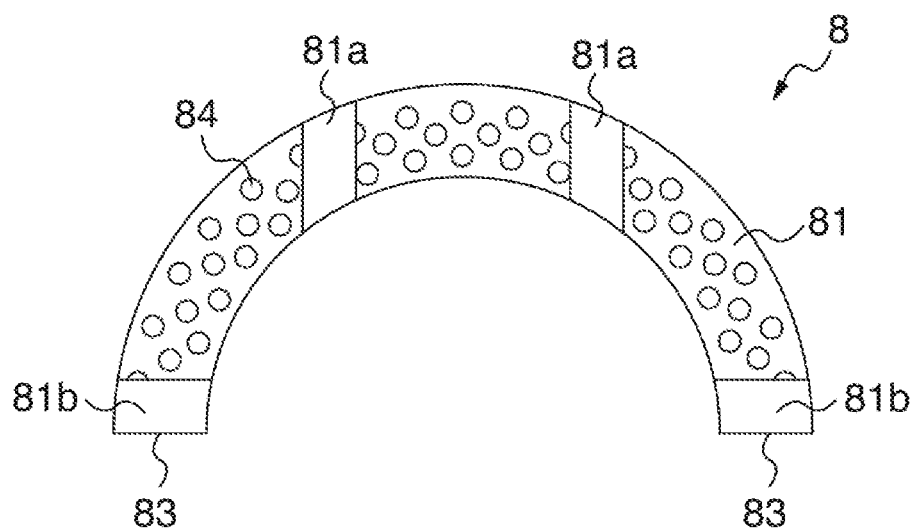
FIG. 2 is a front view of a half thrust bearing according to an embodiment of the present invention.
Figure 3:
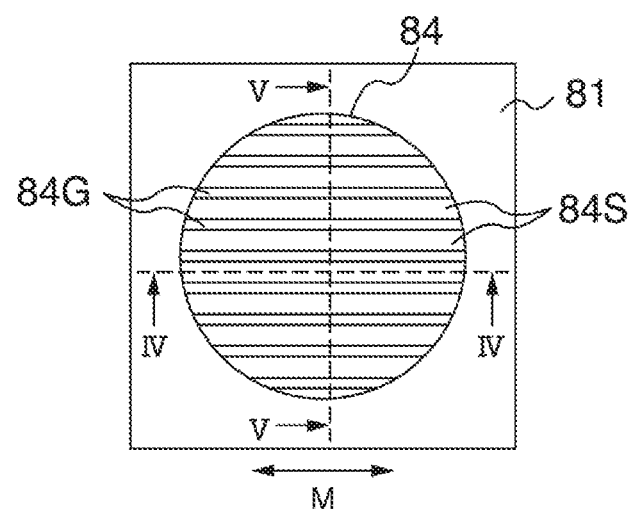
FIG. 3 shows a recess in FIG. 2, viewed from a sliding surface side.
Figure 4:
FIG. 4 is a cross-sectional view of IV-IV cross section (in circumferential direction) of FIG. 3.
Figure 5:
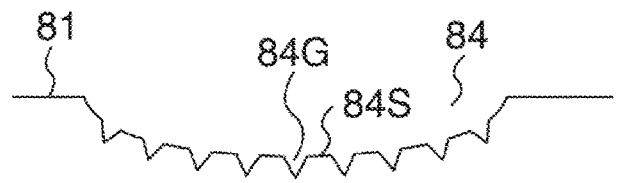
FIG. 5 is a cross-sectional view of a V-V cross section (in diameter direction) of FIG. 3.
Figure 6:
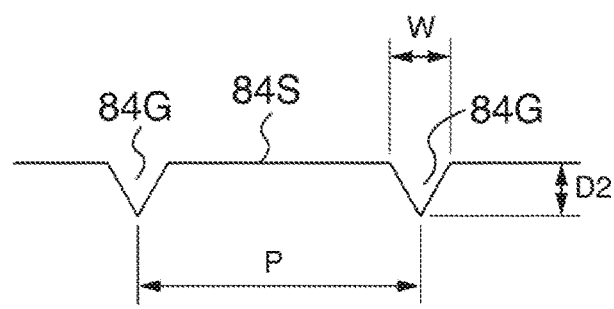
FIG. 6 is a cross-sectional view of circumferential grooves.

FIG. 2 shows an example of a plurality of recesses 84 on the sliding surface 81 of the half thrust bearing 8. FIG. 3 shows an example of the recess 84 viewed from a sliding surface side. Please note that the present invention is not limited to the embodiment. For easier understanding, the recesses are exaggerated in the drawings.

In the embodiment, the plurality of recesses 84 on the sliding surface 81 have openings having the same shape, area, and size such as a depth, and are uniformly arranged substantially throughout the sliding surface. The "uniform" arrangement of the plurality of recesses 84 on the sliding surface 81 does not indicate strictly geometrically uniform arrangement but may be approximately or substantially uniform arrangement.

FIG. 3 shows the recess 84 having a circular opening to the sliding surface 81. A smooth surface 84S of the recess 84 includes a plurality of circumferential grooves 84G. The plurality of circumferential grooves 84G extend in a direction parallel to a circumferential direction M of the half thrust bearing 8. The smooth surfaces 84S and the circumferential grooves 84G of the recess 84 are alternately arranged across the diameter direction of the half thrust bearing 8. The smooth surface 84S has no grooves, protrusions, or the like, but may have minute asperities which are sufficiently small as compared with the circumferential grooves.

A recess surface, which refers to a smooth surface of the recess excluding the circumferential grooves, is recessed toward the back surface of the half thrust bearing 8 in cross-sectional view in the circumferential direction of the half thrust bearing 8 (i.e., cross section in the circumferential direction, such as a IV-IV cross section in FIG. 3). That is, the recess surface forms a convex curve toward the back surface (see FIG. 4). The circumferential groove in cross-sectional view in the circumferential direction of the half thrust bearing 8 is also recessed toward the back surface of the half thrust bearing 8. Please note that the term "cross section" indicates a cross section in a direction perpendicular to the sliding surface 81.

In an embodiment, the recess 84 preferably also forms a curve which is recessed toward the back surface of the half thrust bearing 8 in cross-sectional view in any direction, for example in the diameter direction of the half thrust bearing, as well as the circumferential direction of the half thrust bearing 8.

The recess 84 has a depth D1 from the sliding surface 81 of preferably 2 to 50 μm, more preferably 2 to 25 μm. The depth of the recess 84 is a distance, in the direction perpendicular to the sliding surface, between a virtual surface of the sliding surface extending to the opening of the recess and a deepest part of the smooth surface of the recess. In a case where the opening of the recess 84 has a circular shape, the opening may have a diameter of 0.05 to 5 mm. In a case where the opening of the recess has a shape other than the circular shape, the opening preferably has the same area as that of a circle having the above diameter (equivalent circle diameter).

The plurality of circumferential grooves 84G viewed from the sliding surface side of the half thrust bearing extend from a peripheral edge of the recess 84 in the circumferential direction of the half thrust bearing 8. A center line of the groove i.e. a line passing through a bottom (deepest part defining a depth D2) of the circumferential groove 84G viewed from the sliding surface side of the half thrust bearing forma an arc line and has a center of circle which is same as a center of circle of an outer or inner peripheral edge of the half thrust bearing 8. In other words, the plurality of circumferential grooves 84G extend along a rotation direction X of the thrust collar 12 of the crankshaft (i.e., a sliding direction of the thrust collar 12 and the sliding surface 81). However, the circumferential grooves 84G are allowed to be slightly tilted, up to 3°, with respect to the circumferential direction of the half thrust bearing 8.

The depth D2 of the circumferential groove 84G is preferably 0.2 to 3 μm. The depth D2 of the circumferential groove 84G is smaller than the depth D1 of the recess 84. The "depth of the circumferential groove" is defined as the deepest depth of the circumferential groove from the smooth surface adjacent to the circumferential groove in cross-sectional view in a width direction of the circumferential groove.

A width W of the circumferential groove 84G is a length in the diameter direction of the half thrust bearing of the circumferential groove 84G on the surface 84S of the recess 84 (see FIG. 6) and is preferable to be 5 to 50 μm. The width W of the circumferential groove 84G is preferably determined such that at least five circumferential grooves 84G can be formed in a single recess 84. A pitch P of the circumferential grooves 84G is defined as a length between the deepest parts of the adjacent circumferential grooves 84G in the diameter direction of the half thrust bearing (see FIG. 6). The pitch P is preferably 5 to 100 μm.

In an embodiment, a depth D2 of the circumferential groove 84G, which is a depth from the surface 84S of the recess 84, is made constant along the extension of the circumferential groove 84G (i.e. a longitudinal direction of the circumferential groove 84G), except in circumferential end regions. Furthermore, the width W of the circumferential groove 84G is also made constant along the longitudinal direction of the circumferential groove 84G (see FIG. 5). A cross section of the circumferential groove 84G is preferably V-shaped. However, the shape is not limited to the V-shape and may be other shapes.

However, the depth D2 and the width W of the circumferential groove 84G may be changed along the longitudinal direction of the circumferential groove 84G. In such a case, the "depth" and the "width" of the circumferential groove respectively indicate the maximum depth and the maximum width of the circumferential groove 84G and these maximum values are preferably sized to meet the above described depth and width.

The half thrust bearing 8 of the embodiment may have a sliding layer made of a Cu bearing alloy or an Al bearing alloy on a back-metal layer made of an Fe alloy. However, the half thrust bearing may be made of only a Cu bearing alloy or an Al bearing alloy without the back-metal layer. The sliding surface 81 (including surfaces of the recesses 84) may have a surface part made of one of Bi, Sn, and Pb, which are softer than the bearing alloy, or an alloy including the metals as a main component. Alternatively, the surface part may be made of a resin composition including synthetic resin as a main component. However, the surface of the recess 84 preferably does not have such a surface part. If the surface 84S of the recess 84 or the surface of the circumferential groove 84G has such a soft surface part, when oil contains many foreign substances, the foreign substances are more likely to be embedded and accumulated. If the foreign substances are embedded and accumulated on the surface 84S of the recess 84 or the surface of the circumferential groove 84G, turbulence is more likely to occur in the oil flowing in the recess. Please note that, even though the above surface part is added onto the sliding layer, the surface of the sliding layer is referred to as a sliding surface.

As described above, the half thrust bearing 8 of the present invention has the recesses 84 on the sliding surface, and each recess 84 includes the smooth surface 84S and the plurality of circumferential grooves 84G. The half thrust bearing can reduce friction loss. A reason thereof will be described below.

Figure 9:
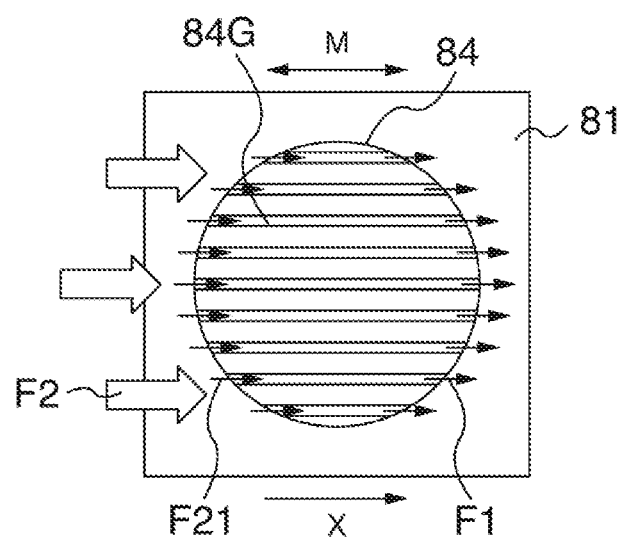
FIG. 9 shows oil flows in the recess of FIG. 3.

FIG. 9 shows a state where the surface of the thrust collar 12 of the crankshaft distant from the sliding surface 81 of the half thrust bearing 8 having the plurality of recesses 84 has moved relatively closer to the sliding surface 81, and the surface of the thrust collar 12 has become closest to the sliding surface 81. In this state, the oil in the recess 84 is compressed to have high pressure and flows from the recess 84 into the sliding surface/thrust collar gap. The surface of the recess 84 has the plurality of circumferential grooves 84G which extend in the direction parallel to the circumferential direction M of the half thrust bearing 8. Accordingly, part of an oil flow F2 following the surface of the thrust collar and flowing in the rotation direction X of the surface of the thrust collar 12 starts forming, in the circumferential groove 84G of the recess 84, an oil flow F21 flowing into the recess 84 from the sliding surface/thrust collar gap on a rear side in the rotation direction X. Thus, the oil in the recess 84 is guided to the circumferential grooves 84G and flows in the same direction as the circumferential direction M of the half thrust bearing 8 (the rotation direction X of the surface of the thrust collar 12). The oil then flows out into the sliding surface/thrust collar gap along the circumferential direction M.

As described above, in the sliding surface/thrust collar gap, the oil flow F2 following the rotating surface of the thrust collar 12 has been formed (see FIG. 9). The oil flow F2 flows in the same direction as an oil flow F1 flowing from the recess 84. Accordingly, turbulence is less likely to occur, and thus friction loss is less likely to occur.

Alternative non-limiting embodiments of the present invention will be described below.

Second Embodiment

Figure 10:
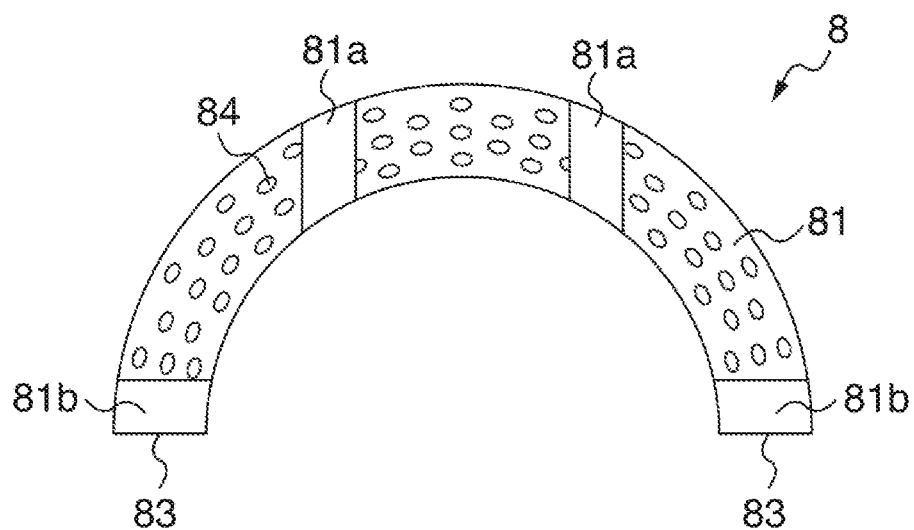
FIG. 10 is a front view of the half thrust bearing according to a second embodiment of the present invention.
Figure 11:
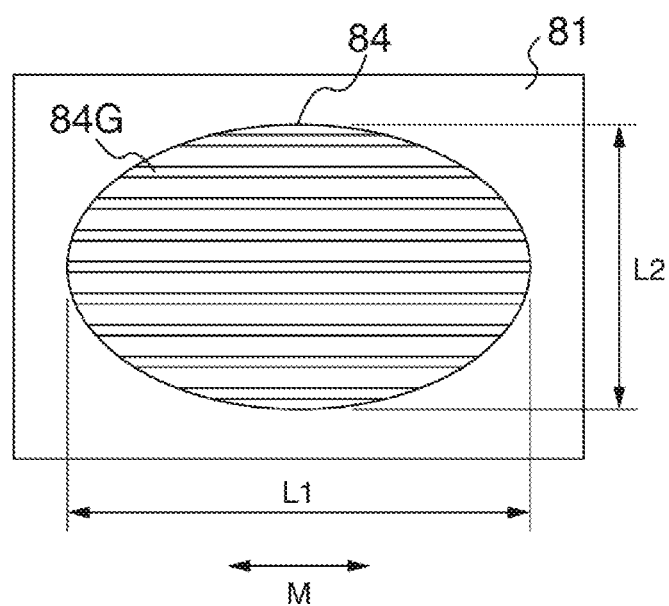
FIG. 11 shows a recess of FIG. 10, viewed from the sliding surface side.

In the example shown in FIGS. 10 and 11, a plurality of recesses 84 are substantially uniformly located on the sliding surface, and each recess 84 has an elliptical opening with its major axis L1 extending along a direction parallel to the circumferential direction M of the half thrust bearing 8 and its minor axis L2 extending along a direction parallel to the diameter direction of the half thrust bearing 8. Please note that the major axis L of the elliptical opening of the recess 84 is allowed to be slightly tilted (up to 3°) with respect to the circumferential direction of the half thrust bearing 8.

The recess 84 has a curved surface which is recessed toward the back surface (convex toward the back surface) of the half thrust bearing 8 not only in cross-sectional view in the circumferential direction of the half thrust bearing 8 but also in cross-sectional view in any direction other than the circumferential direction of the half thrust bearing 8. The recesses 84 have the same maximum depth D1 from the sliding surface 81.

In the half thrust bearing 8 of the embodiment, the plurality of recesses 84 each have an elliptical opening with its major axis L1 extending along the direction parallel to the circumferential direction M of the half thrust bearing 8. Accordingly, when the surface of the thrust collar 12 becomes closest to the sliding surface 81 of the half thrust bearing 8, oil in the recess 84 is guided to the circumferential grooves 84G and the oil is more likely to flow in the same direction as the circumferential direction M of the half thrust bearing 8 (i.e. the rotation direction X of the surface of the thrust collar 12). Thus, the oil is more likely to flow into the sliding surface/thrust collar gap of the half thrust bearing 8 in the same direction as the circumferential direction NI of the half thrust bearing 8.

Third Embodiment

Figure 12:
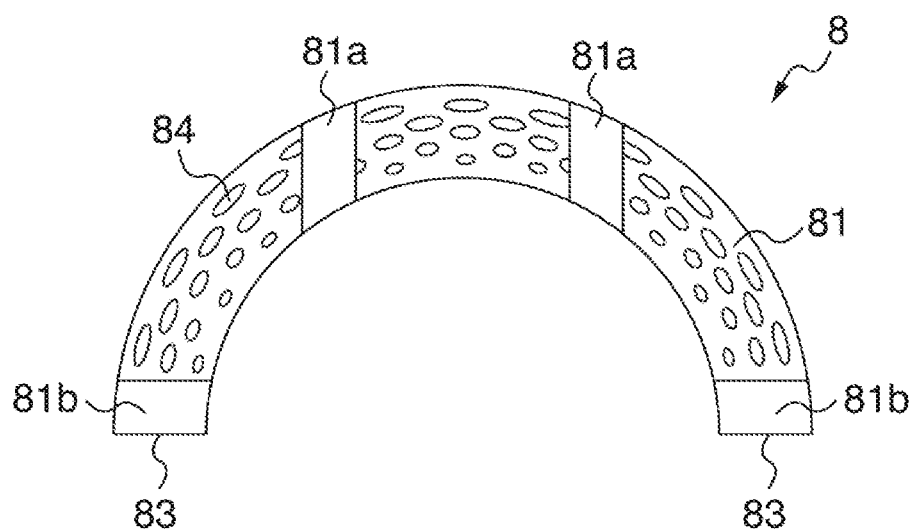
FIG. 12 is a front view of the half thrust bearing according to a third embodiment of the present invention.

In an example shown in FIG. 12, a plurality of recesses 84 are also substantially uniformly located on the sliding surface, and each recess 84 has an elliptical opening with its major axis L1 extending along a direction parallel to the circumferential direction M of the half thrust bearing 8 and its minor axis L2 extending along a direction parallel to the diameter direction of the half thrust bearing 8. The recess 84 has a curved surface which is recessed toward the back surface (convex toward the back surface) of the half thrust bearing 8 not only in cross-sectional view in the circumferential direction of the half thrust bearing 8 but also in cross-sectional view in any direction other than the circumferential direction of the half thrust bearing 8. The recesses 84 have the same maximum depth D1 from the sliding surface 81.

However, as the recess 84 is located closer to an outer peripheral edge (outer diameter side) of the half thrust bearing 8, an area of the opening of the recess 84 increases. In other words, as the recess 84 is located closer to an inner peripheral edge (inner diameter side) of the half thrust bearing 8, the area of the opening of the recess 84 decreases. In the embodiment, the elliptical openings of the recesses 84 have the same minor axis length L2, regardless of a position of the recess 84 in the diameter direction on the sliding surface 81. However, as the recess 84 is located closer to the outer peripheral edge (outer diameter side), a major axis length L1 of the elliptical opening of the recess 84 increases.

During operation of the internal combustion engine, vibration or deflection occurs in the crankshaft in some cases. In such a case, the surface of the thrust collar 12 is more likely to directly come into contact with the sliding surface 81 of the half thrust bearing 8 located closer to the outer peripheral edge (outer diameter side) of the half thrust bearing 8. In the half thrust bearing 8 of the embodiment, as the recess 84 is located closer to the outer peripheral edge (outer diameter side) of the half thrust bearing 8, an area of the opening of the recess 84 increases. Accordingly, when the surface of the thrust collar 12 becomes closer to the sliding surface, as the recess 84 is located closer to the outer peripheral edge (outer diameter side) of the sliding surface 81, pressure of a larger amount of oil in the recess 84 becomes higher. Thus, even when vibration or deflection occurs in the crankshaft, the surface of the thrust collar 12 is less likely to directly come into contact with the sliding surface 81 near the outer peripheral edge (outer diameter side) of the half thrust bearing 8.

In some internal combustion engines, the surface of the thrust collar 12 is more likely to directly come into contact with the sliding surface 81 of the half thrust bearing 8 located closer to the inner peripheral edge (inner diameter side) of the half thrust bearing 8 during operation. In such a case, unlike in this embodiment, the recess 84 of the half thrust bearing 8 may be configured such that, as the recess 84 is located closer to the inner peripheral edge (inner diameter side) of the half thrust bearing 8, the area of the opening of the recess 84 increases. In other words, as the recess 84 is located closer to the outer peripheral edge (outer diameter side), the area of the opening of the recess 84 decreases.

Fourth Embodiment

Figure 13:
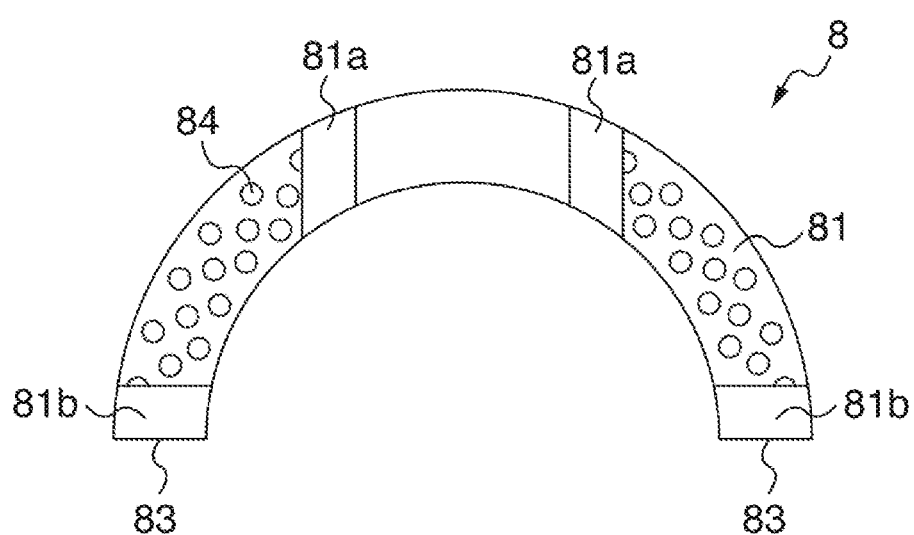
FIG. 13 is a front view of the half thrust bearing according to a fourth embodiment of the present invention.

In an example shown in FIG. 13, the sliding surface of the half thrust bearing 8 includes two oil grooves 81a and a plurality of recesses 84 uniformly located only in regions between the oil grooves 81a and corresponding circumferential end faces 83 (or thrust reliefs 81b, if any). The recess 84 is not provided in a region between the two oil grooves 81a. Other configurations are same as those of the half thrust bearing described in the first embodiment.

Fifth Embodiment

Figure 14:
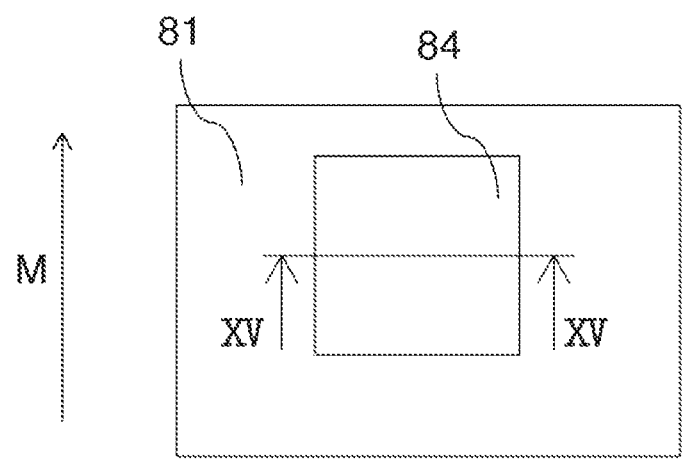
FIG. 14 shows a recess of the half thrust bearing according to a fifth embodiment of the present invention, viewed from the sliding surface side.

An example shown in FIG. 14 shows a recess 84 having a quadrilateral opening on the sliding surface 81. An arrow M indicates a circumferential direction of the half thrust bearing 8. Two sides of the quadrilateral opening of the recess extend along the circumferential direction of the half thrust bearing 8. Please note that circumferential grooves 84G are omitted in FIG. 14.

Figure 15:
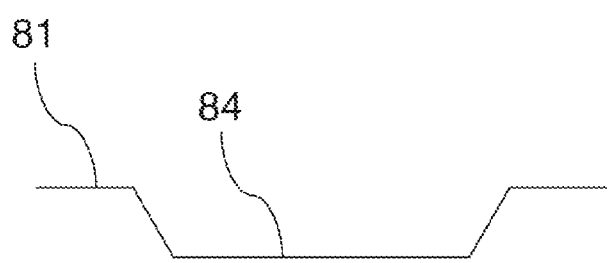
FIG. 15 is a cross-sectional view of a XV-XV cross section (in diameter direction) of FIG. 14.

FIG. 15 shows a C-C cross-sectional view (i. e. cross section in the diameter direction cut along the diameter direction of the half thrust bearing 8) of the recess 84 in FIG. 14. The cross section has a reverse trapezoidal shape, and a surface of the recess 84 is parallel to the sliding surface 81, excluding both ends of the recess 84 in the diameter direction. Please note that the circumferential grooves 84G are omitted also in FIG. 15. The surface of the recess 84 in cross-sectional view in the circumferential direction of the half thrust bearing 8 is a curved and recessed toward the back surface of the half thrust bearing 8.

Sixth Embodiment

Figure 16:
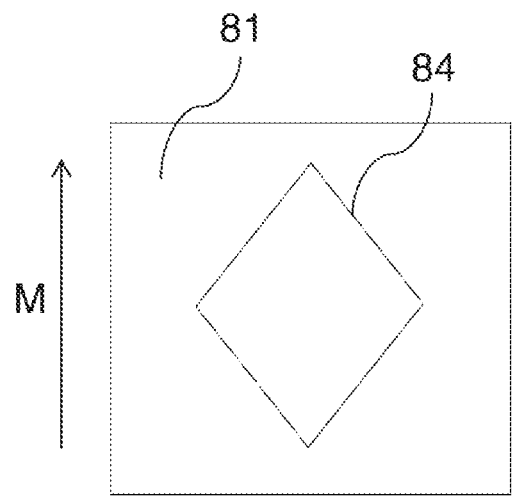
FIG. 16 shows a recess of the half thrust bearing according to a sixth embodiment of the present invention, viewed from the sliding surface side.

FIG. 16 shows a recess 84 having a quadrilateral opening on the sliding surface 81. Unlike in FIG. 14, a diagonal line of the quadrilateral opening of the recess extends along the circumferential direction of the half thrust bearing 8. In the recess 84 in FIG. 16, a surface of the recess 84 in cross-sectional view in a direction parallel to the circumferential direction of the half thrust bearing 8 is curved and recessed toward the back surface of the half thrust bearing 8. Also, the surface of the recess 84 in cross-sectional view in a direction parallel to the diameter direction of the half thrust bearing 8 is curved and recessed toward the back surface. Also in FIG. 16, circumferential grooves 84G are omitted.

As stated above, circular, elliptical, and quadrilateral shapes are explained as the shape of the opening of the recess 84. However, these shapes of the opening do not indicate geometrically precise circular, elliptical, and quadrilateral shapes and they may be substantially circular, elliptical, and quadrilateral. Furthermore, the shape of the opening of the recess 84 is not limited to these shapes and other shapes may be applied.

The half thrust bearing of the present invention has been described with the embodiments.

The above description is made to the embodiments where the half thrust bearing of the present invention is applied to a thrust bearing constituted by combining a pair of the half thrust bearings into an annular shape and for receiving an axial force of a crankshaft of an internal combustion engine. The half thrust bearing of the present invention is also applicable to a single thrust bearing for receiving an axial force of a crankshaft of an internal combustion engine.

As described above, the half thrust bearing of the present invention may be bimetal made of a back-metal layer and a bearing alloy or may be made of only a bearing alloy without the back-metal layer (also in this case, a surface to come into contact with the thrust collar is referred to as a sliding surface, and a surface opposite to the sliding surface is referred to as a back surface).

The shape of the half thrust bearing of the present invention is not limited to a semi-annular shape having a length forming a circumferential angle of 180° in the circumferential direction, and may be a substantially semi-annular shape having a length forming a circumferential angle of slightly smaller than 180°. Furthermore, the half thrust bearing of the present invention may have an oil groove and a thrust relief having different shapes other than the shapes shown in the drawings. Alternatively, the half thrust bearing of the present invention may have no oil grooves or thrust reliefs.

In the embodiments, the sliding surface is parallel to the surface (back surface) opposite to the surface of the back-metal layer to which the bearing alloy layer is bonded, and the sliding layer has a constant thickness. However, the present invention is not limited thereto. The sliding layer may have a changing thickness, and for example, the thickness may be maximum at the inner periphery of the sliding surface of the half thrust bearing and continuously decrease toward the outer periphery of the sliding surface. Furthermore, the sliding layer may have a changing thickness along the circumferential direction of the half thrust bearing.

In the embodiments, only the sliding surface 81 includes the recesses 84. However, the present invention is not limited thereto, and a surface of the thrust relief 81*b* or of the oil groove 81*a* may also include recesses similar to the recesses 84.

The invention claimed is:

1. A half thrust bearing for receiving an axial force of a crankshaft of an internal combustion engine, the half thrust bearing having a semi-annular shape and having a sliding surface for receiving the axial force and a back surface opposite to the sliding surface,
    wherein the sliding surface comprises a plurality of recesses, each recess having a recess surface,
    wherein the recess surface is recessed from the sliding surface toward the back surface of the half thrust bearing and is convex toward the back surface of the half thrust bearing in a cross-sectional view in a circumferential direction of the half thrust bearing, and
    wherein the recess surface comprises a plurality of circumferential grooves, the circumferential grooves being recessed from the recess surface toward the back surface of the half thrust bearing, and the circumferential grooves extending along the circumferential direction of the half thrust bearing so that smooth surfaces and the circumferential grooves are alternately arranged on the recess surface.

2. The half thrust bearing according to claim 1, wherein a depth of the recess is 2 to 50 μm.

3. The half thrust bearing according to claim 1, wherein a depth of the circumferential groove is 0.2 to 3 μm.

4. The half thrust bearing according to claim 1, wherein a width of the circumferential groove is 5 to 50 μm.

5. The half thrust bearing according to claim 1, wherein the circumferential grooves are located with a pitch of 5 to 100 μm.

6. The half thrust bearing according to claim 1, wherein an opening of the recess has a circular shape, an elliptical shape, or a quadrilateral shape.

7. The half thrust bearing according to claim 1, wherein the recess surface is convex toward the back surface of the half thrust bearing in cross-sectional view in a diameter direction of the half thrust bearing.

8. The half thrust bearing according to claim 1, wherein the recesses are uniformly located throughout the sliding surface of the half thrust bearing.

9. The half thrust bearing according to claim 1, wherein as the recess is located closer to an outer peripheral edge of the sliding surface of the half thrust bearing, the recess has larger area of the opening.

10. The half thrust bearing according to claim 1, wherein an opening of the recess has an elliptical shape, a major axis of the elliptical shape extending along the circumferential direction of the half thrust bearing.

* * * * *